Figure 1:
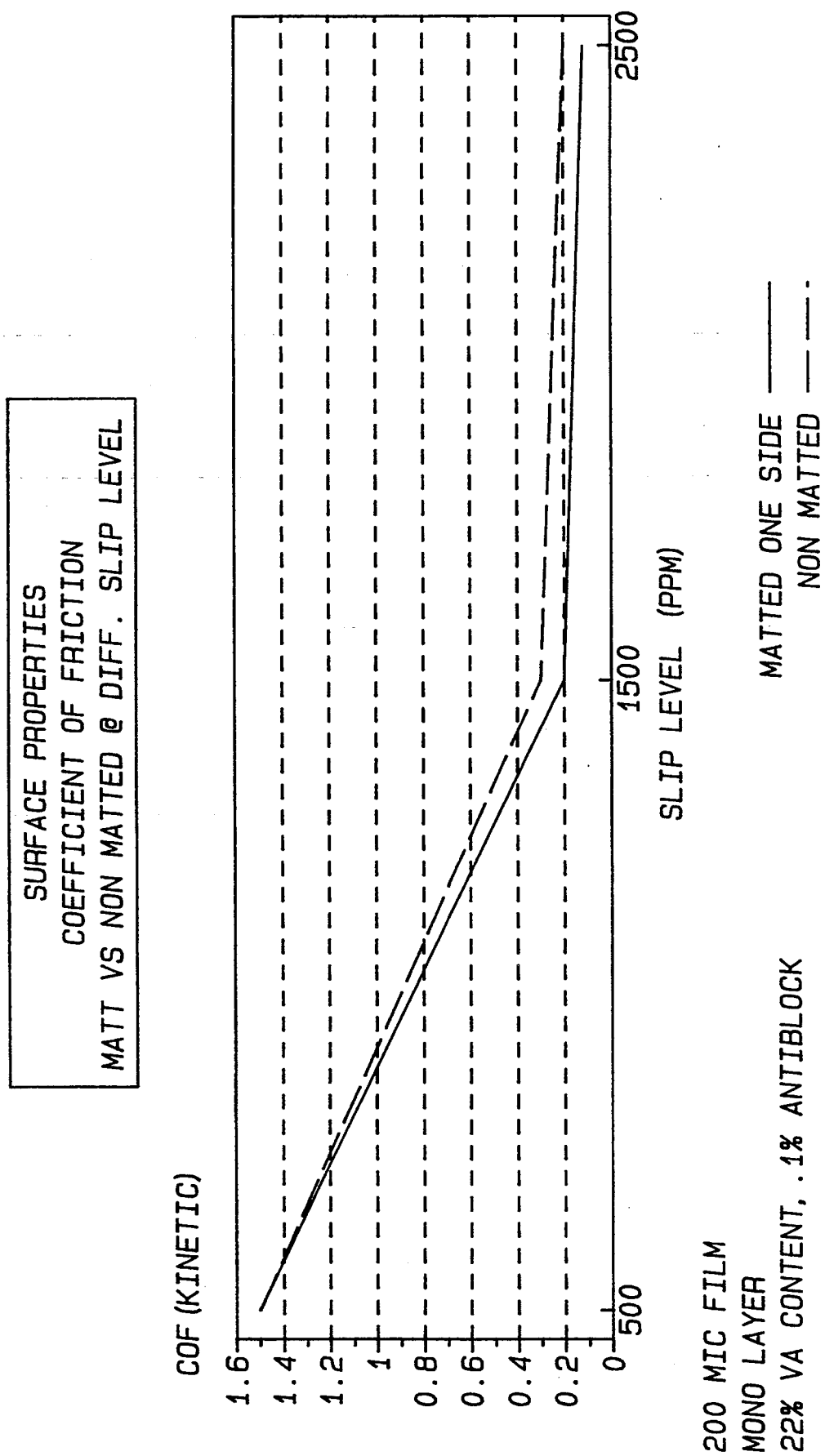

United States Patent [19]

Ohlsson et al.

[11] Patent Number: 5,399,396
[45] Date of Patent: Mar. 21, 1995

[54] MULTI-LAYER FILM

[75] Inventors: Stefan B. Ohlsson; Philippe De Cambourg, both of Brussels; Willy J. J. Leysen, Meerhout, all of Belgium

[73] Assignee: Exxon Chemical Patents Inc., Linden, N.J.

[21] Appl. No.: 112,633

[22] Filed: Aug. 26, 1993

Related U.S. Application Data

[63] Continuation of Ser. No. 763,092, Sep. 20, 1991, abandoned.

[30] Foreign Application Priority Data

Sep. 21, 1990 [GB] United Kingdom ............... 9020653
Oct. 19, 1990 [GB] United Kingdom ............... 9022814

[51] Int. Cl.6 .............................................. B32B 27/00
[52] U.S. Cl. .................................. 428/34.7; 428/36.6; 428/36.7; 428/141; 428/159; 428/345; 428/354; 428/355
[58] Field of Search .................. 428/34.3, 34.6, 34.7, 428/36.6, 36.7, 345, 349, 351, 354, 355, 347, 343, 141, 159

[56] References Cited

U.S. PATENT DOCUMENTS

| | | | |
|---|---|---|---|
| 4,197,326 | 4/1980 | Wakamatsu et al. | 426/412 |
| 4,380,567 | 4/1983 | Shigemoto | 428/349 X |
| 4,389,450 | 6/1983 | Schaefer et al. | 428/349 X |
| 4,469,742 | 5/1984 | Oberle et al. | 428/347 X |
| 4,590,124 | 5/1986 | Schoenberg | 428/349 X |
| 4,617,241 | 10/1986 | Mueller | 428/349 |
| 4,848,564 | 7/1989 | Scheller et al. | 428/156 X |
| 4,855,183 | 8/1989 | Oberle | 428/349 X |
| 4,940,634 | 7/1990 | Mueller et al. | 428/349 |
| 4,956,212 | 9/1990 | Bekele | 428/349 X |

FOREIGN PATENT DOCUMENTS

| | | |
|---|---|---|
| 0013745 | 8/1980 | European Pat. Off. |
| 0142315 | 5/1985 | European Pat. Off. |
| 0342822 | 11/1989 | European Pat. Off. |
| 2031801 | 11/1970 | France |
| 2177974 | 2/1987 | United Kingdom |

Primary Examiner—George F. Lesmes
Assistant Examiner—Blaine R. Copenheaver
Attorney, Agent, or Firm—Douglas W. Miller

[57] ABSTRACT

Multi-layered films are disclosed which have a barrier layer and at least one seal layer. The seal layer is made with a copolymer of ethylene and ethylenically unsaturated ester. The seal layer is radio frequency (RF) sealable and the seal layer has an anti-block matted surface. The matted seal layer surface permits a lower slip and anti-block additive level which improves RF sealing and heat sealing.

17 Claims, 2 Drawing Sheets

MULTI-LAYER FILM

This application is a continuation of U.S. Ser. No. 07/763,092, filed Sep. 20, 1991, now abandoned.

FIELD OF INVENTION

The invention relates to multi-layer films for use in packaging, especially liquids, which can be sealed together using radio-frequency radiation.

BACKGROUND OF INVENTION

Films of PVC are used to package liquids in pouches. Such films may be formed into a tube by sealing them by heat edge-to-edge. Liquids can then be introduced and successive pouches can be formed by pressing opposed surfaces together using "radio frequency" "RF" welding bars and heating the surfaces to above the sealing temperature by radio-frequency. This is known as the form-fill & seal process. The liquids may be concentrated chemicals such as detergents and household cleaning products such as bleach. The RF sealing contact has to be established through liquid contaminated surfaces. For environmental reasons replacement of PVC film is desirable.

The packaging of liquids by a procedure as described involved generally requires a barrier property to ensure good package integrity. Best barrier properties are obtained using polymers having a low content of polar groups which acts against their RF sensitivity. Good barrier films are hence generally—except for PVC—not easily heated by RF frequencies. Poor barrier properties result in an escape of volatile components such as perfume additives but also to a loss of water upon prolonged storage.

The package integrity also requires that the seal be permanent and non-peelable i.e. cannot be peeled apart below the tear strength of the film. This in turns means that RF welding has to be performed with sufficient intensity using appropriate polymers and RF field strengths. Corona treatment can improve printability but may reduce seal strength, film shelf-life and worsen blocking.

The films used should be processable at high speeds. This in turn means that the film should be non-blocking and does not stick to any equipment used for controlling it on the packaging line. Materials having a high polar group content have low melting points and can be sealed but have poor barrier characteristics and tend to stick and block.

The high processing speeds also necessitate that the RF-welding should proceed quickly without sparking. In industry lower RF frequencies such as 27 MHz are commonly used. The content of polar groups should preferably be sufficiently high to give fast, proper sealing at lower frequencies.

Films may also contain slip agents and fillers to modify their characteristics to reduce blocking for example but RF weldability and printability can be adversely affected. Excessive levels of slip agent may cause the agent to migrate to the surface during storage and affect shelf-life in a commercially unacceptable manner. Migrated slip agent fouls the processing line and may prevent the formation of a permanent seal in RF welding.

Although a number of proposals have been made discussed below for replacing PVC film on RF-sealing packaging lines, none has achieved commercial acceptance up till now as far as inventors are aware. It has not been possible to devise a film which resolves the above contradictions and combines non-blocking, high RF sealability and seal strength and good barrier properties.

GB 2177974 (DRG) uses an inner layer of preferably 18 to 28 wt % vinyl acetate (VA) EVA polymer and outer layers of less RF absorbent material. The low VA content in the outer layers reducing sticking and blocking. However the sealing temperature range is reached using heat transfer between inner RF heatable layer and outer seal layers which will tend to reduce speed of operation. The central high VA layer has poor barrier characteristics.

U.S. Pat. No. 4,678,713/EP 222900 (Dow) and other related documents use high VA outer layers for RF welding, but high enough VA contents to provide fast RF welding cannot be processed at high line speeds because of high friction and blocking.

EP 13745 (BRDR Schur) discloses in column 4 lines 49–54 the use of film covered on one or both sides with EVA which can be RF welded while the base layer may be polyethylene. While widely varying VA contents are indicated EVA's with 16 mol % VA are recommended especially. Such EVA's have low crystallinity and lack sufficient strength to provide a permanent seal. The result is a peelable film seal not a permanent seal necessary to provide high package integrity under mechanical stress. JP 55059921 (Mitsui) discloses EVA as an RF sealable material. JP 53091989 (Asahi-Dow) incorporates PVC and EVA. 83 JP 031755 discloses a complex RF sealable structure. Dow U.S. Pat. No. 4,601,948; EP 223838 (U.S. Pat. No. 4,787,194); EP 223838 (WO-8607034) also disclose EVA materials. U.S. Pat. No. 4,539,793 (Johnson+Sons Inc) discloses an RF sealable packaging construction.

Other EVA film disclosures include FR-2031801; EP-142315 (Grace) and EP 342822 and EP-345927 where a matted surface is provided by embossing for use in the baling of rubber.

It is the object of the invention to provide a non-PVC film which has a combination of properties to provide a commercially acceptable PVC film replacement.

It is in particular an object of the invention to provide a non-PVC film which has a good barrier property, which can give a permanent seal by RF welding and/or which is non-blocking, processable and storable.

SUMMARY OF THE INVENTION

A broad aspect of the invention is based on the appreciation that by providing a matted surface other film parameters can be selected or adapted to provide overall a film meeting commercial requirements.

Accordingly the invention provides a multi-layer film having a barrier layer of a thermoplastic material and on at least one side thereof a seal polymer derived of ethylene and an ethylenically unsaturated ester which is RF weldable in which the seal polymer has an anti-block matted surface.

The matted surface adds to the anti-block characteristic sufficiently to permit use of EVA's with a relatively high VA content and reduced levels of slip and processing aids so as to provide for satisfactory RF and heat sealing. This in turn permits sufficiently fast processing, yet provides good seal and overall package integrity even when the core layer is a generally RF-inert material. The matted surface may be produced by cast film embossing; calendering or post-embossing.

Preferably the surface has a gloss of 30 or less based on ASTM-D-2457-70 at 45°, preferably 20 or even 8 or less. Conveniently the overall coefficient of friction as determined by ASTM-D 1894 is 0.3 or less preferably 0.25 or less. The matting is generally provided by using a take-up roller after extrusion, a calendering or an embossing roller having a particular surface configuration. The surface configuration may be random or geometric. If random the surface has an Ra (height of roughness irregularities as measured by the average value of the departures from a center line drawn such that the sum of the areas above the line equals the sum of those below the line) of from 20 to 300 microinches (0.5–7.6 micrometers), preferably from 30 to 250 microinches (0.75–6.4 micrometers). If geometric, there are preferably from 100 to 350 geometric repeating units per inch (39 to 138 per cm) of surface, preferably with a pattern formed by intersecting lines and with from 150 to 300 lines per inch (59 to 118 lines per cm), said intersecting lines defining a rectangle, a square or a diamond shape.

Matting can for example be obtained by using a rubber take-up roll having an Ra of at least 20 preferably from 30 to 35 and/or having a hardness from 45 to 55 Shore A.

The requisite matted surface lowers blocking (which also depends on ester content and anti-block and slip additive content) to provide a blocking value of less than 75 grams based on ASTM test D 3354-74, preferably less than 55.

Thus in more specific aspects of the invention the following features can be provided.

The proportion of the ethylenically unsaturated ester may be fairly high, preferably from 5 to 12 mol %, preferably from 8 to 10 mol %. In the case of the vinyl acetate (VA) or methylacrylate (MA) this corresponds approximately to from 12.5 to 30 wt %. The preferred range, corresponding to from 20 to 25 wt % helps to ensure that a non-peelable seal is obtained. The requisite level of ethylenically unsaturated ester may be achieved by using a single polymer component having a corresponding comonomer content. It could also be achieved by using more than one polymer with varying comonomer contents, the average of which corresponds to the ranges indicated above.

The esters are conveniently vinylacetate, methylacrylate, ethylacrylate or butylacrylate. The proportion should be high enough to promote easy heat sealing and RF welding but not so high that blocking occurs or seal integrity is destroyed. An EVA with a VA content of 21.5 wt % VA may be used. The EVA may include or consist of a cross-linked high VA material such as ethylene glycol dimethacrylate crosslinked EVA having a VA % in excess of 30 wt %.

The seal polymer may contain units derived from comonomers other than ethylenically unsaturated esters. For example units derived from acrylic acid or methacrylic acid or other compolymerisable carboxylic acid or anhydrides may be incorporated provided the requisite balance of processing sealing and barrier properties in maintained. The seal polymer may also be a blend of a functionalized polymer with a non-functionalized polymer in which case the concentration of ethylenically unsaturated esters should still preferably be present at the level of 7.5 to 10 mol % having regard to the overall blend.

The melt index (MI) of the seal polymer is determined to optimize extrudability for coextruded multilayer constructions, the necessary strength and sealability. Typically the MI (190° C.; 2.16 kg load) is from 0.1 to 5, preferably from 0.3 to 2.0 and especially from 0.5 to 1.8.

Desirably low additive levels may be employed benefitting weldability and particular heat sealability. Typically the seal polymer contains less than 0.4 wt % of an organic acid; less than 3 wt % of a silica anti-block additive, preferably from 0.5 to 1.5 wt %; and/or less than 0.5, weight percent preferably less than 0.2 wt % of an organic acid salt such as calcium stearate. Low slip agent levels are possible which contribute to a satisfactory storage life of the film in rolled film. Suitably the seal polymer layer is substantially free of wax or low molecular weight polymer products.

For packaging liquid pouches using the form-fill & seal process it is desirable to have a seal polymer layer on both sides which may be used to provide a heat seal and/or an RF welded seal. Advantageously then both have the same composition but one may be mat and the other may be polished or matted. The polished surface may be provided by using a chill roll having a RMS of 0–5. The non-matted seal polymer layers may be adapted for printing information. One or both seal polymer layers may include an opacifying agent.

Preferably less than 15 wt %, especially less than 10 wt % of opacifying agent may be used in the seal polymer. The ester content may have to be increased to establish the correct RF weldability. $TiO_2$ or $CaCO_3$ may be used as opacifying agents.

Advantageously neither side is corona-treated. In conventional films it was believed that this promotes printability. However, particularly in the presence of slip agent and other additives, it has been found that corona-treatment, is advantageously omitted.

Using seal polymer layers with such matting and especially high ester content and low additive content, it is possible to use barrier layers which are substantially devoid of polar groups and are not heated by RF radiation because the seal polymer layers reach a sufficiently high temperature without RF heating of the central layer to provide a good seal strength suitable for a permanent seal i.e. with a strength above that of the strength of the film itself.

Preferably the barrier layer is of a suitable olefin homo or copolymer such as polymers derived from ethylene or higher alpha-olefins such as propylene or butylene. Suitable polymers include polyethylene such as high-density polyethylene (HDPE) but especially linear-low-density polyethylene (LLDPE), polyisobutylene (PIB). Butyl, halobutyl or EPDM materials may also be used. Mixtures of one or more of the above may also be employed.

The preferred barrier layer is linear polyethylene having a density of from 0.90 to 0.96 especially from 0.915 to 0.95 as may be obtained by copolymerizing appropriate amounts of comonomer such as from 2 to 30 wt %, preferably 5 to 10 wt % of butene, hexene, octene or 1,4 methylpentene. A flexible film with good water barrier properties can so be obtained.

The barrier may be a heterogeneous mixture but the barrier providing polymer should be in a continuous phase in the mixture and any elastomer component, which may be included to provide flexibility but which has poor barrier properties, should be a discontinuous phase.

Preferably the barrier layer is a composite layer of a polyethylene and a polyamide or EVOH layer, preferably with a polyethylene layer on each side of a polyamide or EVOH layer, the polyethylene preferably being LLDPE.

The overall proportion of the barrier and seal polymer layers and hence their thickness has to be selected in accordance with processing conditions. At higher processing speeds, thinner seal polymer layers may heat up more quickly but the RF power should be kept below that which leads to sparks between the RF electrode bars. If the layer is too thin, the heat which builds up may dissipate too quickly to provide sealing. A certain minimum seal layer thickness is also desirable to ensure a sufficient amount of RF-sensitive polar groups is present to provide the desired heating effect. Thus the barrier should have a thickness in the range of from 150 to 300 micron. Conveniently the seal polymer layer has a thickness of over 25 micron preferably at least 50 micron.

The film may be produced by lamination but is preferably coextruded.

In form-fill & seal processes frequencies of from 10–50 MHz can be used for a seal time of from 0.1 to 3 seconds to give a non-peelable seal.

EXAMPLES

Master batches of slip additive, antiblock additive and opacifying agent where dry blended in the extruder hopper or melt-blended previously using a single or twin screw compounding extruder.

The polymers were extruded into film on a cast-film line using three extruders (a first having a 30 mm diameter and the remaining pairs having a 25 mm diameter for extruding the seal layer). The extrusion conditions were

| | |
|---|---|
| extrusion temperature | 200° C. |
| die temperature | 180° C. |
| chill roll temperature | 18° C. |
| output | 15 kg/hour |
| film thickness and configuration | 150–250 micron and as indicated in more detail in the result table. |

The film was matted by the following procedure by using a take-up roller after extrusion. The roughness in Ra of the rubber roller was 30. The Shore A hardness was 50. The film composition and properties are set out in Tables 1 to 4. The coextruded films with A-B-A structure approximate or exceed PVC film properties.

Figure 2:
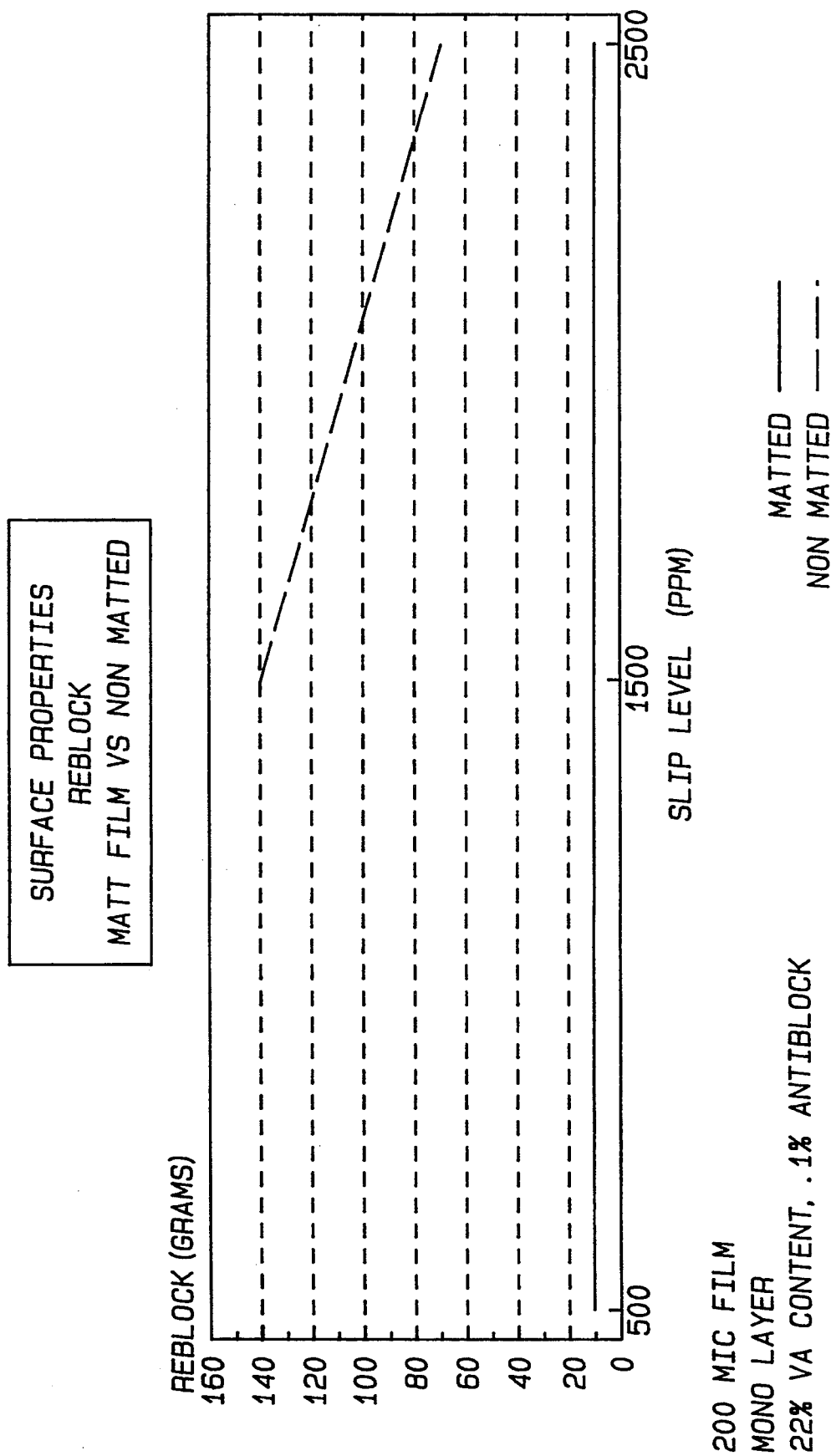

The films obtained were tested for kinetic coefficient of friction (ASTM D-1894 measured 7 days after extrusion), see FIG. 1, and reblocking (ASTM D-3354-74), see FIG. 2 also measured at least 7 days after extrusion).

(Sample $V_1$, $V_2$, $V_3$, $X_1$, $X_2$, $X_3$)

FIGS. 1 and 2 show the major effect of matting on high VA content films. Non-matted films had unacceptable re-blocking characteristics. For both matted and unmatted low sliplevels lead to excessive coefficients of friction. Satisfactory low coefficients of friction can be reached with low sliplevels (around 1500 ppm) which permit a relatively extended shelf life for the rolled film.

Table 1 shows the compositions and structures used for testing.

Table 2 shows the mechanical proporties of a number of LLDPE-EVA A-B-A co-extruded structures with varying VA contents.

Table 3 shows barrier properties. It can be seen that A-B-A structures match PVC barrier characteristics.

Table 4 shows processing properties. A-B-A films can produce blocking values of 75 or less and even 55 or less.

Table 5 illustrates how the RF sealability depends critically on the % of VA with higher VA materials which are normally liable to block giving the best results.

TABLE 1b

| | FILM COMPOSITION | | | | | | | |
|---|---|---|---|---|---|---|---|---|
| | EVA SEAL LAYER 2) | | | BARRIER (all barrier structures are ABA) | | | | FILM |
| FILM SAMPLE | MI (g/10 min 190° C.; 2.16 KG) | wt % VA | slip agent ppm 1) | Mat'l | Thickness (micron meters) | MI | Anti-oxidant (ppm) 5) | THICKNESS/ (micron meters) | MATTING |
| A | 0.3 | 18 | 1000 | LLDPE 3) | 60 | 1 | 1000 | 250 | Y |
| B | 1.0 | 26 | 3000 | LLDPE | 60 | 1 | 1000 | 250 | Y |
| C | 0.7 | 19 | 2500 | LLDPE | 60 | 1 | 1000 | 250 | Y |
| D | 1.8 | 22 | 3000 | LLDPE | 60 | 1 | 1000 | 250 | Y |
| E | 1.8 | 22 | 3000 | LLDPE | 60 | 2 | 1800 | 250 | Y |
| F PVC | — | — | — | not applicable | — | — | | 209 | M |
| G | 0.3 | 18 | 1000 | LLDPE/PIB 40 wt % 4) | 60 | 1 | 1000 | 150 | Y |
| H | 0.3 | 18 | 1000 | LLDPE/PIB 60 wt % | 90 | 1 | 1000 | 150 | Y |
| I PVC | — | — | — | monolayer - no separate barrier | | | | 220 | M |
| K EVA | 0.3 | 18 | | | | | | 150 | M |
| L EVA | 2 | 26 | | | | | | 150 | M |
| M | 1.8 | 22 | 2000 | LLDPE | 60 | 2 | 1800 | 260 | Y |
| N | 1.8 | 22 | 2500 | LLDPE | 60 | 2 | 1800 | 260 | Y |
| blown film | 1.8 | 22 | 2500 | LLDPE | 60 | 2 | 1800 | 260 | M |
| P 6) | 2.5 | 12 | — | monolayer - no separate barrier | | | | 150 | M |
| Q EVA | 0.3 | 18 | — | | | | | 150 | M |
| R EVA | 0.7 | 19 | — | | | | | 150 | M |
| S EVA | 2 | 20 | — | | | | | 150 | M |
| T EVA | 2 | 26 | — | | | | | 150 | M |

TABLE 1b-continued

| | FILM COMPOSITION | | | | | | | |
|---|---|---|---|---|---|---|---|---|
| | EVA SEAL LAYER 2) | | | BARRIER (all barrier structures are ABA) | | | FILM | |
| FILM SAMPLE | Ml (g/10 min 190° C.; 2.16 KG) | wt % VA | slip agent ppm 1) | Mat'l | Thickness (micron meters) | Ml | Anti-oxidant (ppm) 5) | THICKNESS/ (micron meters) | MATTING |
| U EVA | 3 | 28 | — | | | | | 150 | M |

1) erucamide
2) also contains 10,000 ppm silica antiblock; 6 wt % TiO$_2$/CaCO$_3$ (1:2) specifier and 550 ppm of BHT anti-oxidant calculated on the total weight of the seal layer.
3) Butene comonomer; density 0.920
4) Mw 800000
5) 1:4 blend of Irganox 1076 and Irganox 168 (Registered Trade Marks)
6) free of additives for all EVA monolayers P to U TABLE 1b

| | FILM COMPOSITIONS | | | | | | | |
|---|---|---|---|---|---|---|---|---|
| | EVA SEAL LAYER 2) | | | BARRIER (all barrier structures are ABA) | | | FILM | |
| FILM SAMPLE | Ml (g/10 min 190° C.; 2.16 KG) | wt % VA | slip agent ppm 1) | Mat'l | Thickness (micron meters) | Ml | Anti-Oxidant (ppm) 5) | THICKNESS/ (micron meters) | MATTING |
| V$_1$ | 1.8 | 22 | 500 | Mono layer | | | | 200 | Y |
| V$_2$ | 1.8 | 22 | 1500 | | | | | 200 | Y |
| V$_3$ | 1.8 | 22 | 2500 | | | | | 200 | Y |
| X$_1$ | 1.8 | 22 | 500 | Mono layer | | | | 200 | M |
| X$_2$ | 1.8 | 22 | 1500 | | | | | 200 | M |
| X$_3$ | 1.8 | 22 | 2500 | | | | | 200 | M |
| Y | 1.8 | 22 | 1500 | LLDPE | 50 | 2 | 1800 | 250 | Y |

1) erucamide
2) also contains 10,000 ppm silica antiblock; 6 wt % TiO$_2$/CaCO$_3$ (1:2) specifier and 550 ppm of BHT anti-oxidant calculated on the total weight of the seal layer.
3) Butene comonomer; density 0.920
4) Mw 800000
5) 1:4 blend of Irganox 1076 and Irganox 168 (Registered Trade Marks)
6) free of additives for all EVA monolayers P to U

TABLE 2

| | MECHANICAL PROPERTIES | | | | | | | | | | |
|---|---|---|---|---|---|---|---|---|---|---|---|
| | TENSILE at BREAK | | ELONG. at BREAK | | 1% SEC MODULUS | | 10% FORCE | | PUNCTURE | | |
| FILM SAMPLE | MD MPa | TD MPa | MD % | TD % | MD MPa | TD MPa | MD N | TD N | FORCE N | TRAVEL mm | ENERGY mj |
| A | 22.5 | 23.9 | 576 | 744 | 62 | 68 | 16.6 | 17.0 | 122 | 32 | 2290 |
| B | 16.5 | 18.6 | 599 | 710 | 42 | 50 | 12.0 | 13.5 | 122 | 47 | 3825 |
| C | 18.4 | 19.2 | 616 | 650 | 57 | 59 | 15.1 | 15.5 | 124 | 35 | 2800 |
| D | 13.4 | 17.1 | 605 | 659 | 50 | 56 | 13.4 | 13.8 | 120 | 44 | 3490 |
| E | 21.2 | 24.1 | 593 | 736 | 34 | 32 | 9.0 | 12.1 | 217 | 43 | 3130 |
| F | 23.9 | 19.1 | 276 | 308 | 34 | 34 | 11.6 | 9.1 | 143 | 39 | 3360 |

TABLE 3

| | BARRIER PROPERTIES | |
|---|---|---|
| Film Sample | MVTR (moisture vapor transmission rate) 1) | Weight Loss 2) |
| E | 6.3 | 13 |
| G | 5.6 | 16 |
| H | 3.3 | 16 |
| I | 24 | >5 |
| K | 38 | 43 |
| L | 50 | Not available |

1) g/m$^2$, 24 hours, 100% relative humidity.
2) at 40° C., 40 days using sachets filled with fabric softener.

TABLE 4

| REBLOCKING | |
|---|---|
| Film Sample | Reblocking 1) |
| A | 1 |
| E | 16 |
| E comparative not matted | 22 |
| M | 71 |
| N | 35 |
| O | 50 |
| V$_2$ | 9 |
| X$_2$ non matted | 140 |
| Y | 52 |
| PVC | 57 |

1) 40° C., ,24 hr, ASTM-D-3354-74

TABLE 5

| | RF SEALABILITY 3) | | | | | | | |
|---|---|---|---|---|---|---|---|---|
| | Seal on non contaminated surface | | | | Seal through contamination | | | |
| Film Sample | Seal strength (M/15 mm) | Elongation (%) | Energy (J) | Comment 1) | Seal strength (M/15 mm) | Elongation (%) | Energy (J) | Comment 1) |
| A | 28 | 295 | 4.2 | PEL | 23 | 45 | 0.4 | P |
| C | 28 | 350 | 4.4 | PEL | 18 | 37 | 0.2 | P |
| D | 29 | 400 | 4.3 | EDEL | 25 | 386 | 4 | PEL |
| B | 29 | 420 | 3.8 | EDEL | 27 | 410 | 4.2 | EDEL |
| E | 32 | 533 | 4.4 | EDEL | 26 | 465 | 3.6 | EDEL |
| E 4) | 20 2) | 395 | 3.1 | PEL | — | — | — | — |
| E | 28 2) | 495 | 4.0 | EDEL | — | — | — | — |
| P | 18 | 180 | 1.8 | PEL | 13 | 16 | 0.1 | P |
| Q | 15 | 190 | 1.1 | PEL | 11 | 25 | 0.1 | P |
| R | 21 | 330 | 2.8 | EDEL | 19 | 300 | 2.6 | EDEL |
| S | 20 | 355 | 2.6 | EDEL | 18 | 340 | 2.4 | EDEL |
| T | 17 | 370 | 2.4 | EDEL | 17 | 395 | 2.3 | EDEL |
| V | 16 | 450 | 2.4 | EDEL | 13 | 380 | 1.8 | EDEL |

1) P = peeling occurs without film elongation
PEL = peeling occurs with film elongation
EDEL = seal resists peeling, the film elongates and tears
2) Overlap seal of (matt side against gloss side).
3) Seals established using Raydyne FW$_4$HF sealer at 27.3 MHz; 80% power setting; 0.5 sec seal time.
4) The film was corona treated.

We claim:

1. A multi-layer film comprising:
   (a) a barrier layer, said barrier layer selected from the group consisting of polyethylene, a composite layer of a polyethylene and a polyamide and a composite layer of a polyethylene and an EVOH; and
   (b) a seal layer, said seal layer being an ethylene copolymer, having in the range of from about 5 to about 12 mol percent of a comonomer selected from the group consisting of vinyl acetate, ethyl acrylate, methyl acrylate and butyl acrylate; wherein said multi-layer film is RF weldable in the range of from about 10 to about 50 MHz to form a non-peelable seal and wherein said seal layer has an anti-block matted surface.

2. Film according to claim 1 in which the matted surface provides a blocking value of less than 75 g as determined in accordance with ASTM D 3354-74.

3. A film according to claim 2 wherein the matted first seal polymer layer contains less than about 0.4 weight percent of an amide of an organic acid, less than about 3 weight percent of silica and is substantially free from an organic salt.

4. A film according to claim 1 further comprising a second seal polymer layer on a second side of the barrier layer, said second seal polymer layer has a matted surface, and wherein each of the seal polymer layers are the same composition.

5. A film according to claim 1 wherein the barrier layer is a linear polyethylene material having a density of from 0.9 to 0.96 g/cc.

6. A film according to claim 1 wherein the barrier layer is a composite layer of a polyethylene and a polyamide layer.

7. A film according to claim 1 wherein the first and second seal polymer layers have a thickness of at least about 25 micrometers the barrier layer has a thickness of about at least 20 micrometers and the film has an overall thickness of from about 150 to about 300 microns.

8. A film according to claim 1 wherein the ethylenically unsaturated ester is selected from the group consisting of vinyl acetate and methylacrylate.

9. A film according to claim 4 wherein the first and second seal polymer layers are different compositions.

10. A film according to claim 6 wherein the polyethylene component of the barrier layer is a linear low density polyethylene.

11. A film according to claim 6, further comprising a polyethylene layer on each side of said barrier layer.

12. A film according to claim 11, wherein the polyethylene layer is linear low density polyethylene.

13. A film according to claim 7 wherein the seal polymer layers have a thickness of at least about 50 micrometers.

14. A film according to claim 4 wherein said second seal polymer layer has a polished surface.

15. A film according to claim 1 wherein the barrier layer is a composite layer of polyethylene and an ethylene vinyl alcohol layer.

16. A film according to claim 15 wherein the polyethylene component of the barrier layer is a linear low density polyethylene.

17. A film comprising:
   (a) a barrier layer, said barrier layer selected from the group consisting of:
      (i) a linear polyethylene having a density of from about 0.90 to about 0.96 g/cc,
      (ii) a composite layer of a polyethylene layer and a polyamide layer, and
      (iii) a composite layer of a polyethylene layer and an EVOH layer; and
   (b) a seal layer comprising a copolymer of ethylene and an ethylenically unsaturated ester, said ester being selected from the group consisting of vinyl acetate and methyl acrylate, said ester being present in said seal layer in the range of from about 20 to about 25 weight percent based on the total weight of the ethylene copolymer; wherein said film is RF weldable in the range of from about 10 to about 50 MHz to form a non-peelable seal and said seal layer has an anti-block matted surface.

* * * * *